Patented Jan. 17, 1933

1,894,764

UNITED STATES PATENT OFFICE

OTTO GROSSKINSKY, OF LUDWIGSHAFEN-ON-THE-RHINE, AND MAX TREPPENHAUER, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF CARBON BLACK

No Drawing. Application filed November 13, 1930, Serial No. 495,537, and in Germany November 23, 1929.

This invention relates to improvements in the manufacture and production of carbon black.

The manufacture and production of carbon black by the thermal decomposition of carbonaceous compounds on metallic surfaces, such as surfaces of iron or cobalt or nickel or several of these metals or by means of special catalysts, such as those containing metals of the iron group, was hitherto often attended by the difficulty that especially in continuous processes the apparatus frequently became clogged within a short time by masses of carbon black, which are difficult to remove, and that even when employing catalysts well suited for the production of good carbon black only a low quality carbon black was frequently obtained due to an agglomeration of the particles of the resulting product.

We have now found that these objections are to a high degree due to the materials hitherto employed for constructing the inner walls of the reaction vessel. In accordance with our invention the manufacture and production of carbon black by the catalytic decomposition of carbonaceous compounds which are in the gaseous or vaporous state at the temperatures employed for the reaction is carried out without the said difficulties occurring by carrying out the decomposition in apparatus the inner surfaces of the walls of which consist of a heat-resistant metallic material which effects no appreciable decomposition of the initial materials to carbon black under the working conditions. In particular, any considerable amounts of free unmasked iron, nickel or cobalt must not be present in the material employed for constructing the inner surfaces of the apparatus. Suitable materials for this purpose are, for example, the metals silver, copper, aluminum, chromium, or alloys containing these metals, as bronzes, brass, copper-manganese, iron-chromium alloys, in particular alloyed steels, as for example iron-chromium-nickel steels such as V2A-steel or V4A-steel or V6A-steel, ferro-silicon, nitrated steel or alloys marketed as NCT8, and ferrotherm and the like. According to the present invention the said materials may be employed for constructing the entire walls of the apparatus, or the apparatus may be constructed of some readily available material, such as iron or ordinary steel and lined on the inside with a sheet of any of the said materials. It may sometimes prove advantageous to jacket the apparatus. Good results are also obtained by constructing the apparatus of iron or ordinary steel and enamelling, chroming or alitizing the inner walls, or giving them a similar coating or surface alloying with a metal, which effects no appreciable decomposition of the initial materials to form carbon black. Enamelled or chromed iron may also be employed for lining the apparatus.

Since the said materials of which the inner surfaces consist, do not take part in the reaction, no corrosion or roughening of the walls of the vessel takes place and, therefore, the objections hitherto experienced which consist in the fact that particles of the catalyst remain attached to the roughened walls of the vessel and give rise to the formation and collection of masses of carbon black which clog the apparatus, are avoided. Moreover, the working life of the apparatus is considerably increased, since the apparatus material can no longer be injured by a participation in the reaction such as takes place in iron vessels with considerable destruction of the surface of the inner walls.

In order to prevent the deposition of carbon black which may readily lead to trouble, it is preferable to make the inner surface of the apparatus as smooth as possible in cases when the material used for the construction or lining of the apparatus has not already a smooth surface. If, as in many cases, devices for moving the catalyst and removing the carbon black formed, such as scrapers, worm conveyors, brushes or the like, are necessary, it is recommended that they be constructed of the said materials also for the reasons already specified.

Any of the great variety of apparatus already suggested for the preparation of carbon black may be employed according to the present invention.

It may in some cases prove advantageous to apply the principle of heat exchange in the process according to the present invention. Thus, the hot carbon black produced and the hot reaction gases may be made to give up their heat to the incoming gases in a heat exchanging apparatus.

As examples of the gaseous or vaporous carbonaceous initial materials employed in the process according to the present invention may be mentioned hydrocarbons and in particular saturated or unsaturated gaseous hydrocarbons, such as methane, natural gas, ethane, propane, butane or other paraffin hydrocarbons, ethylene, propylene, butylene, or other olefines, oil gas, cracking gases, acetylene. Oxides of carbon, namely carbon monoxide or dioxide may also be mentioned as examples of the said carbonaceous materials.

Any of the said gases may be mixed with any of the others, or extraneous gases, such as water vapor or small amounts of hydrogen may be added, or extraneous gases may be added to the gas mixture. An addition of a small amount of hydrogen is sometimes advantageous for initiating the decomposition.

Pressures of very different degrees may be employed in the process according to the present invention. It is simplest to work at atmospheric pressure. A particularly good temperature control is obtained by working under reduced pressure, and the carbon black produced is in a particularly fine state of dispersion. A very large reaction space is however required when working in this manner. Rarefaction of the reacting gases by means of an inert gas gives very much the same effect as rarefaction by reduction of pressure. The apparatus must of course be capable of resisting the pressure reduction. In some cases advantages may be obtained by working under increased pressure. Thus, pressures of 5, 10 or 50 atmospheres or more may be employed. In this manner a very high output of carbon black per unit of reaction space is obtained, and the reaction frequently proceeds very energetically.

The catalyst may be employed in a pulverulent or shaped state and the gas mixture to be decomposed may be moved through the catalytic chamber in the same direction or in counter current.

Catalysts consisting of or containing iron, nickel or cobalt or the oxides thereof are particularly advantageous. Activating additions and in particular zinc oxide, difficultly reducible metal oxides, such as earth oxides, may be added to the said catalysts with particular advantage.

Usually temperatures of between about 100° and 600° C. and advantageously of between 200° and 500° C. are employed according to the present invention.

The following example will further illustrate the nature of this invention, but the invention is not restricted to this example.

*Example*

A tube of V2A-steel having an inner diameter of 80 millimeters and a length of 4.5 meters of which 2 meters belong to the reaction zone is inclined by from 10° to 15° from the horizontal and arranged so as to be rotatable about its longitudinal axis. About 10 grams of a mixture of cobalt and zinc oxides (1 part of cobalt to 1 part of zinc with an addition of potash) are introduced per hour continuously into the upper end of the tube.

The tube is heated to 370° C. and set in rotation by a motor by means of toothed wheels so that it makes one rotation each 3 to 4 minutes. After hydrogen has been charged through the tube for 1½ hours in order to reduce the oxide mixture, ethylene is led under atmospheric pressure with a velocity of 150 liters per hour in counter current to the catalyst which is moving slowly downwards through the tube by reason of its rotary motion. The ethylene is decomposed with the deposition of carbon black and the mixture of carbon black and catalyst which flows slowly through the tube collects in a collecting vessel at the lower end of the tube. In this manner about 4 kilograms of carbon black are produced in 24 hours. When the process is carried out continuously, the mixture of hydrogen and methane set free by the decomposition of the ethylene effects the reduction of the catalyst which is continually introduced at the top in the form of oxides. The temperature in the catalytic chamber should amount to about 380° C. After a mechanical or chemical removal of the greater part of the catalyst and after wind sifting, the carbon black is very suitable as a filler for vulcanization products of rubber or polymerization products of diolefines. Mechanical sieves may also be employed for the separation of the catalyst and for grading the carbon black.

When supplying the catalyst in the reduced form to the tube, the length of the tube may be chosen much smaller. As a rule the yield of carbon black with regard to the time and space, the quality of the carbon black obtained, the ratio of amounts of carbon black and catalyst contained in the solid mixture leaving the tube may be varied to a great extent by the length and diameter of the tube, its velocity of rotation, the amount of gases and catalysts supplied per hour and the temperature maintained in the tube.

What we claim is:—

1. In the production of carbon black by catalytic thermal decomposition at a temperature between 100° and 600° C. of a carbon compound in the gaseous phase, the step of confining the reacting materials by walls the inner surfaces of which consist of a heat resisting metallic material, which effects no appreciable decomposition of the initial materials to carbon black under the working conditions.

2. In the production of carbon black by catalytic thermal decomposition at a temperature between 100° and 600° C. of a carbon compound in the gaseous phase, the step of confining the reacting materials by walls the inner surfaces of which consist of a heat-resisting metallic material free from any considerable amounts of free unmasked iron, nickel and cobalt.

3. In the production of carbon black by catalytic thermal decomposition at a temperature between 100° and 600° C. of a carbon compound in the gaseous phase, the step of confining the reacting materials by walls the inner surfaces of which are as smooth as possible and consist of a heat resistant metallic material which effects no appreciable decomposition of the initial materials to carbon black under the working conditions.

4. In the production of carbon black by catalytic thermal decomposition at a temperature between 100° and 600° C. of a carbon compound in the gaseous phase, the step of confining the reacting materials by walls the inner surfaces of which consist of an alloy selected from the group of alloyed steels and ferro-silicon.

5. In the production of carbon black by catalytic thermal decomposition at a temperature between 100° and 600° C. of a carbon compound in the gaseous phase, the step of confining the reacting materials by walls the inner surfaces of which consist of a metal selected from the group consisting of silver, copper, aluminium, chromium and alloys containing these metals.

6. In the production of carbon black by catalytic thermal decomposition at a temperature between 100° and 600° C. of a carbon compound in the gaseous phase, the step of confining the reacting materials by iron walls, the inner surfaces of which have been provided with a protective coating by a fire process selected from the group consisting of enamelling, chromitizing or alitizing.

7. In the production of carbon black by catalytic thermal decomposition at a temperature between 100° and 600° C. of a carbon compound in the gaseous phase, the step of decomposing an unsaturated hydrocarbon in the gaseous phase by heat treatment in the presence of a catalyst comprising a metal of the iron group and confining the reacting materials by walls the inner surfaces of which consist of a heat-resistant metallic material which effects no appreciable decomposition of the initial materials to carbon black under the working conditions.

8. In the production of carbon black by catalytic thermal decomposition at a temperature between 100° and 600° C. of a carbon compound in the gaseous phase, the steps of decomposing an oxide of carbon by heat treatment in the presence of a catalyst comprising a metal of the iron group and confining the reacting materials by walls the inner surfaces of which consist of a heat resisting metallic material, which effects no appreciable decomposition of the initial materials to carbon black under the working conditions.

9. In the production of carbon black by catalytic thermal decomposition at a temperature between 100° and 600° C. of a carbon compound in the gaseous phase, the steps of decomposing a cracking gas by heat treatment in the presence of a catalyst comprising a metal of the iron group and confining the reacting materials by walls the inner surfaces of which consist of a heat-resistant metallic material, which effects no appreciable decomposition of the initial materials to carbon black under the working conditions.

10. A process for the production of carbon black, which comprises passing ethylene through a reaction vessel of chromium-nickel-steel heated to between 100° and 600° C. and containing a catalyst containing cobalt oxide and zinc oxide.

11. A process for the production of carbon black, which comprises passing ethylene through a tube of chromium-nickel-steel heated to about 370° C. and containing a catalyst prepared by reduction with hydrogen of a mixture of the oxides of cobalt and zinc.

12. In the production of carbon black by catalytic thermal decomposition at a temperature between 100° and 600° C. of a carbon compound in the gaseous phase, the step of confining the reacting materials by walls the inner surfaces of which consist of an iron chromium alloy.

13. In the production of carbon black by catalytic thermal decomposition at a temperature between 100° and 600° C. of a carbon compound in the gaseous phase, the step of confining the reacting materials by walls the inner surfaces of which consist of an iron chromium alloy containing nickel.

14. In the production of carbon black by catalytic thermal decomposition at a temperature between 100° and 600° C. of a carbon compound in the gaseous phase, the step of confining the reacting materials by walls the inner surfaces of which consist of an iron chromium nickel steel.

In testimony whereof we have hereunto set our hands.

OTTO GROSSKINSKY.
MAX TREPPENHAUER.